United States Patent Office 3,540,264
Patented Nov. 17, 1970

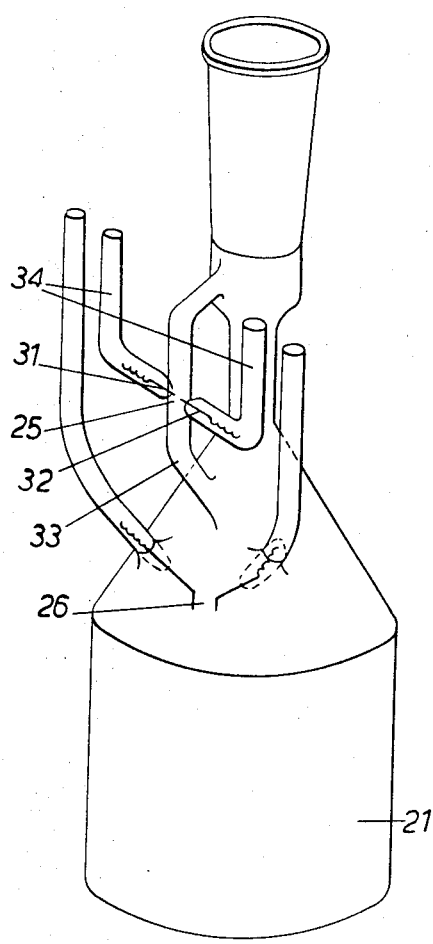
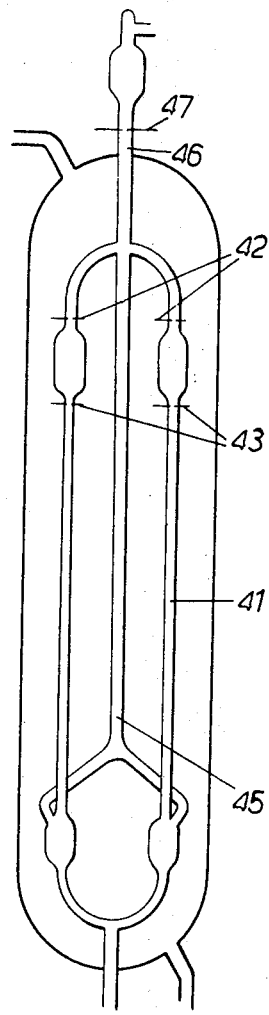

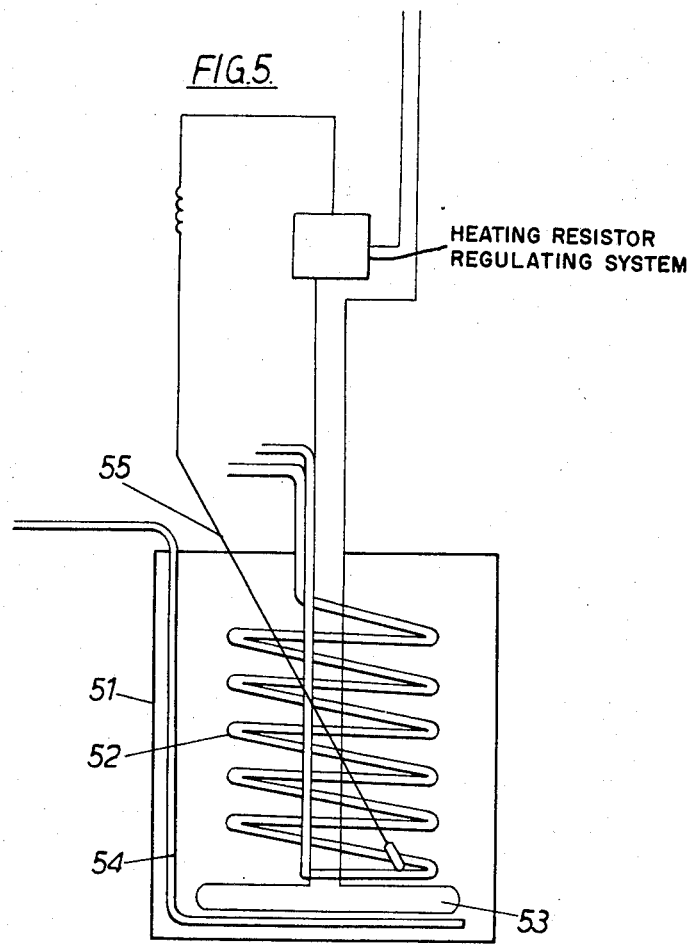

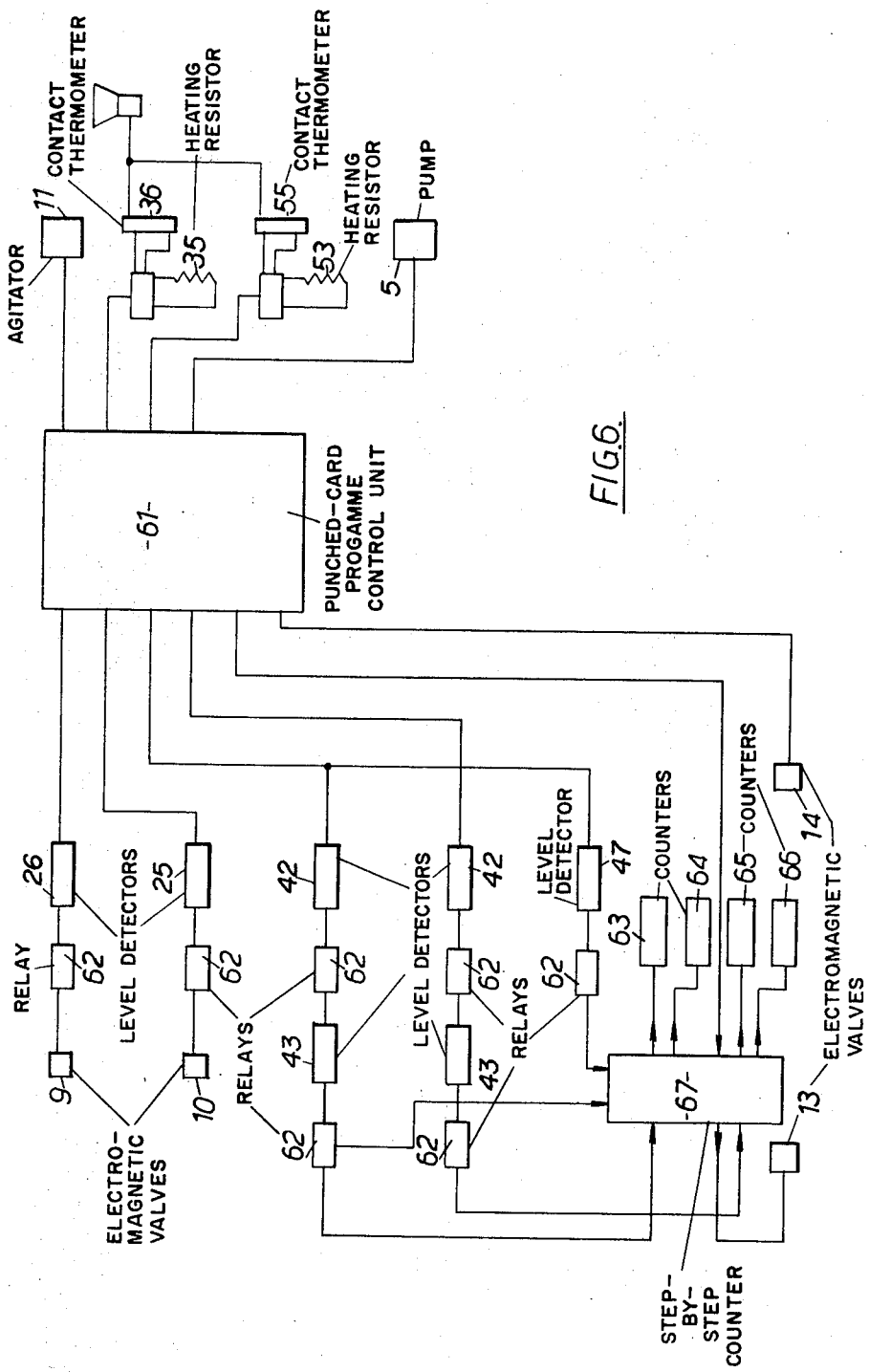

3,540,264
AUTOMATIC VISCOMETER
Claude Cerutti and Philippe de la Gueronniere, Rhone, France, assignors to Societe Rhodiaceta, Paris, France, a French body corporate
Filed Apr. 22, 1968, Ser. No. 723,006
Claims priority, application France, Apr. 24, 1967, 103,923, Patent 1,528,728
Int. Cl. G01n 11/06
U.S. Cl. 73—55                                                5 Claims

ABSTRACT OF THE DISCLOSURE

An apparatus for automatically measuring the viscosity of a polymer solution. The polymer is first dissolved in a temperature controlled chamber having an agitator and a liquid level controller. The test liquid is then drawn into a capillary viscometer by the action of a vacuum source and the time for a given amount of test fluid to pass through the capillary viscometer is measured and recorded. A punched card programmer automatically controls the entire testing cycle.

---

The present invention concerns a device for automatically measuring the viscosity of a liquid, and is applicable more particularly to the measurement of the viscosity of polymer solutions, notably solutions of polyamides, polyesters, polyurethanes polyolefins, cellulose esters, vinyl polymers and acrylonitrile-based polymers.

The devices generally employed for measuring the viscosity of such solutions, such as Ostwald or Ubbelohde viscometers, are manipulated by operators who themselves perform the various operations, namely preparation of the solution, filling of the viscometer and measurement of the time of flow of a given quantity of solution through the capillary tube of the viscometer. These operations are delicate and the operator must expend a great amount of time and care thereon.

Devices for automatically measuring and recording the time of flow of a given quantity of solution through the capillary tube of the viscometer have been proposed. Generally, this time of flow is the interval of time corresponding to travel of a level of the solution passing through the viscometer between two references which consist, in accordance with the detecting device employed, of diaphragms bounding a light beam whose intensity variation is detected, or of electrodes at the terminals of which the change of conductivity or of dielectric constant of the medium separating them is detected.

Such devices substantially improve the precision and the reproducibility of the measurement of the time of flow, but still leave to the operator many manipulations which are just as delicate and important as preliminaries to the measurement of the time of flow. Moreover, these manipulations are sometimes performed with solvents which are dangerous to the operator.

The present invention, provides an apparatus for automatically measuring the viscosity of a solution of a polymer, such apparatus including a dissolving chamber, at least one viscometer, means for regulating the temperature of the dissolving chamber and of the or each viscometer, means for introducing a given quantity of the solvent into the dissolving chamber, means for agitating the said solution, means for conveying the solution between the dissolving chamber and the viscometer, means for detecting and recording the time of flow of a given quantity of the solution through the viscometer, means for emptying the dissolving chamber, and a control device for setting the aforesaid means in operation in accordance with a predetermined programme.

The apparatus according to the invention affords the following main advantages:

(1) The manipulation is easy and involves no danger to the operator;

(2) The measurements of the time of flow are independent of the personal factor of the operator and consequently are more readily reproducible; and, (3) A number of measurements of times of flow may be automatically performed, either simultaneously with a number of viscometers connected to a common dissolving chamber, or successively by repetition of the cycle of measuring the time of flow for as long as is desired, or again both simultaneously and successively.

The dissolving chamber or dissolver must be able to produce a solution of known concentration of a polymer whose relative viscosity it is desired to determine at this concentration. This determination is preferably effected at low concentration, for example 1% by weight per volume of solvent.

It is possible to introduce a solution of known concentration into the dissolver, or to introduce into the latter a predetermined weight and a predetermined volume respectively of the polymer and of the solvent, but the introduction of the solvent is preferably automatically adjusted to the desired volume.

A part of the dissolver has a volume which is equal to the desired volume of solution, which will hereinafter be called the volume of the dissolver and is marked by the level of a liquid with which this part is filled, and is determined by the position of a level detector.

Advantageously, the level detector is formed of two electrodes situated opposite one another at a short distance apart, preferably in a part of the dissolver at which the latter has a small cross-section. In the operation of such a detector the electrodes are externally connected to the dissolver by an electric circuit comprising a generator and elements for detecting the variation of the electrical characteristics of the medium separating the electrodes when the level of the liquid contained in the dissolver reaches the latter.

The viscometer may be of any type by which the time of flow of the solution through a capillary can be measured. Preferably, it is of the Ubbelohde suspended-level type. In this case, the time of flow is measured in known manner by measuring the interval of time separating the instants when the upper level of the solution flowing through the capillary passes a first reference and then a second reference. These references consist of level detectors, preferably of the electrode type.

If desired a number of viscometers may be provided in series, or preferably in parallel, so as to obtain a number of measurements in a single operation. It is also readily possible by means of such arrangements to eliminate aberrations in results due, for example, to impurities partially obstructing a capillary. In the following, the measuring device comprising a viscometer or such associations of viscometers will be referred to as a "viscometric device."

The viscometric device may be maintained at a constant temperature by circulation of a fluid of appropriately adjusted temperature through a jacket surrounding the device. Preferably the temperature of the fluid is adjusted with the aid of a thermostatic device outside the jacket and the rate of flow of the fluid is advantageously so chosen that its temperature variation between the outlet and the inlet of the thermostatic device is very small.

Advantageously the fluid is passed through a jacket surrounding the dissolver, and preferably disposed downstream of the jacket of the viscometric device in relation to the direction of circulation of the fluid. This arrangement makes it possible to equalize the temperatures of the jackets of the dissolver and of the viscometric device, to within the variation of the temperature of the fluid between the outlet and the inlet of the thermostatic device. The solution whose viscosity is to be measured is maintained at the same temperature in the dissolver and in the viscometric device, so that the measurement of the time of flow may immediately follow the preparation of the solution and the transfer of the latter into the viscometric device without any loss of time due to the necessity to adjust the temperature of the said solution before it is passed through the capillary tube. On the other hand, if desired, the dissolving may be effected at a different temperature from the measurement of the time of flow, because it is obviously possible to provide an additional regulation of the temperature of the dissolver during at least the beginning of the perparation of the solution.

In order that the transfer of the solution between the dissolver and the viscometric device may be effected as simply and as rapidly as possible, the conveying means between these two devices comprise a duct which directly connects them together, as also all means for permitting the propulsion of the solution through the duct in one direction or the other.

The circuit of the solvent extending from a storage reservoir to the dissolver and then to the discharge is preferably completely isolated from the atmosphere, whereby all danger of error due to variations of ambient moisture or to the volatile character of the solvent are avoided. In addition, in the case of dangerous, unpleasant or noxious solvents, any discomfort or danger to the operator is eliminated.

The control device by which the aforesaid means are set in operation in accordance with a preset programme is preferably a continuously or discontinuously operating card or drum programme control unit, which is advantageously associated with a step-by-step relay which brings about the succession of operations, such as the measurement of the times of flow, the duration of which depends to a large extent upon the polymer solution to be tested.

The programme may be so designed as to perform one or several repetitive measurements, or as many as desired, the latter readily being obtained by automatic resetting of the step-by-step relay, the times of flow advantageously being recorded on mechanical counters if the number of measurements is small, or otherwise on a printer. It will be appreciated that the sensitivity of the relays, and more particularly of a relay connected to a level detector, must be greater as the electrical resistance set up between the electrodes of the detector by the solution under consideration is greater. Depending upon this resistance, one may employ current relays, valve relays or even field-effect transistorised relays.

In order that the invention will be more readily understood the following description is given, merely by way of example, reference being made to the accompanying drawings, in which:

FIG. 1 diagrammatically illustrates the general layout of one embodiment of apparatus according to the invention, the electrical control device being omitted for clarity;

FIG. 3 is a schematic perspective view of the dissolver of FIG. 2, the only parts illustrated being the level detecting device;

FIG. 4 is an enlarged side elevation of the viscometric device of the apparatus of FIG. 1;

FIG. 5 is an enlarged side elevation of the thermostatic tank of the apparatus of FIG. 1; and FIG. 6 is a circuit diagram of a control device suitable for use with the apparatus of FIG. 1.

Figure 1:
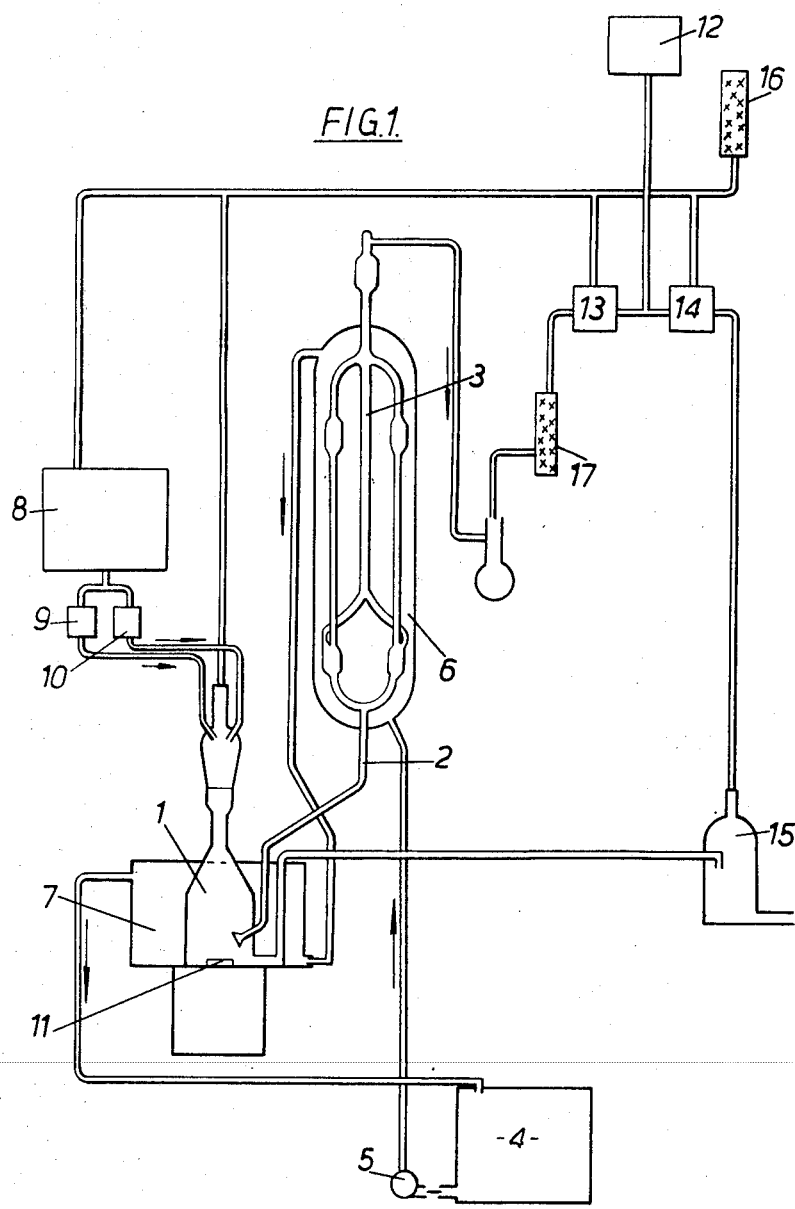

As can be seen from FIG. 1, the apparatus includes a dissolver 1 directly connected by a duct 2 to a viscometric device 3, a thermostatic tank 4 and a pump 5 which circulates water at 25° C. through the chamber 6 of the voscometric device 3 and through a jacket 7 surrounding the dissolver 1, whence the water returns by gravity into the tank 4. In addition, the apparatus comprises a solvent reservoir 8 arranged to feed the dissolver 1 through valves 9 and 10, an agitator 11 disposed in the dissolver, and a vacuum generator 12 for operating the valves 13 and 14, whereby the solution is sucked from the dissolver 1 into the viscometric device 3 and into the discharge tank 15 respectively.

Figure 2:
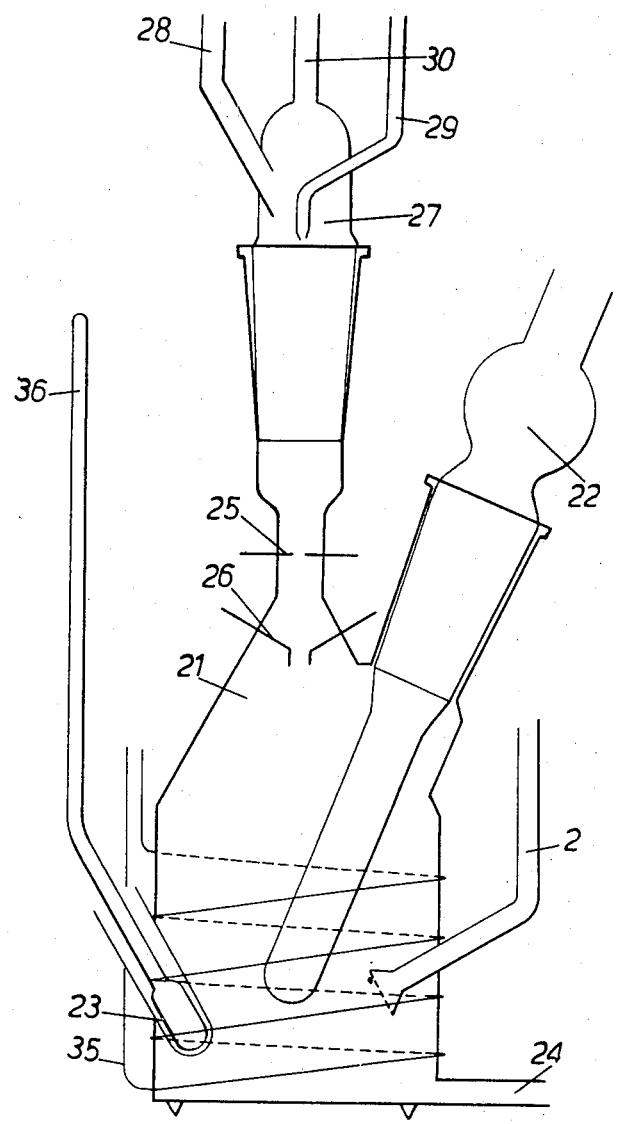
FIG. 2 is a schematic side elevation of the dissolver of the apparatus of FIG. 1, with the level detecting device illustrated diagrammatically.

In FIG. 2, there is shown the dissolver 1, which is formed with a glass body 21, on which is fitted a ground glass charging stopper 22 for the introduction of the specimen, a thermometer casing 23, a duct 2 for connection to the viscometric device 3, a discharge duct 24 and two level detectors 25 and 26. The neck of body 21 is closed by a filling stopper 27 affording passage to the duct 28 and a dropping device 29, which are intended for the introduction of the solvent, as also to the duct 30 connected to a trap column 16 in FIG. 1, which is intended to avoid any admission of moisture into the device.

The arrangement of the level detectors is more clearly apparent from FIG. 3, in which electrodes 31 and 32 of the detector 25 extend into the interior of the glass tube 33 which is branched off at the level of the neck of the body 21, the electrodes consisting of tungsten needles extending through the wall of the tube 33. At their inner ends, inside the tube 33, the needles are pointed, the two points being situated opopsite one another, at a spacing of 2 mm. The other end of each electrode, outside the tube 33, is disposed inside a glass tube 34 welded to tube 33 and containing mercury. Extending from the other end of each of tubes 34 is a conductor wire which electrically connects the electrode to an appropriate relay through the mercury.

The arrangements of the electrodes of the detector 26 is equivalent. It is obviously important that the electrodes of the detectors 25 and 26 should not be disposed in the path of the solvent supplied through the ducts 28 and 29, in order to avoid untimely operation of the detectors.

The device for regulating the temperature of the dissolver makes it possible to dissolve the polymer specimen at a temperature above 25° C. and comprises a heating resistor 35 coiled around the body 21, a contact thermometer 36 and a device (not shown) for regulating the current flowing through the resistor as a function of the temperature of the thermometer, so as to maintain the temperature in the body of the dissolver with a precision in the neighborhood of 1° C. which is sufficient to effect the dissolving.

As shown in FIG. 4 the viscometric device 3, which is made of glass, comprises two vertical measuring tubes, each of which has a capillary tube 41 above which are situated two level references consisting of level detectors 42 and 43 of equivalent construction to the detector 25, and a noncapillary tube 45 connecting the lower and upper ends of each of the measuring tubes. The lower end of the viscometric device is joined to the duct 2 and its upper end is extended by a tube 46 provided with an electrode-type level detector 47 and connected to a vacuum generator through appropriate traps and valves.

Each level detector 42 sets in operation a counter which records in tenths of a second the time elapsing since it was set in operation. The counting is interrupted by the operation of the level detector 43.

FIG. 5 illustrates the thermostatic tank, which comprises a stainless steel container 51, a cooling coil 52 through which water at a temperature below 25° C. is passed at an adjustable rate, a 500-watt heating resistor 53, an air bubbling device 54, a contact thermometer 55 and a system for the regulation of the feed of the heating resistor for the purpose of maintaining at a temperature of 25±0.01° C. the water contained in the tank.

The practical construction of the other elements of the device illustrated in FIG. 1 does not give rise to any particular difficulty. Solvent reservoir 8 is provided with a breathing device by which it is connected to the trap column 16 and feeds the two electromagnetic valves 9 and 10 by gravity. The circuit through which the solvent is supplied into the dissolver advantageously consists of glass, with polytetrafluoroethylene joints, which facilitate the positioning of the various elements.

In order to stir the material in the dissolver, the latter is provided with an agitator 11 in the form of a glass-coated ferromagnetic rod driven by a magnetic driving device situated below the dissolver and the chamber surrounding it.

The vacuum circuit comprises the vacuum generator 12 and two three-way electromagnetic valves 13 and 14 for establishing, respectively, a vacuum and atmospheric pressure in the trap 17 connected to the viscometric device and in the discharge tank 15. The introduction of air at atmospheric pressure takes place by way of the column 16 in order to avoid any admission of moisture.

The pump 5 supplies water to the chamber 6 of the viscometric device from the bottom upwards and then to the chamber 7 of the dissolver, the water level being maintained constant at the height of the neck of the body 21, the return to the tank 4 being effected by gravity.

As can be seen from FIG. 6 the control device for programming all the necessary operations includes a punched-card programme control unit 61 connected to the various control and monitoring members.

The circuits by which unit 61 is connected to the level detectors comprise relays 62 which are each capable of detecting a change of resistance of less than 4500 megohms between the electrodes, for example valve relays.

As previously indicated, level detectors 42, 43 have associated therewith counters, and these counters 63, 64, 65, 66 and also valve 13 are connected to unit 61 by a step-by-step relay 67 to which the level detectors of the viscometric device are also connected.

The programme control unit and the step-by-step relay place the various control and monitoring members in and out of circuit at the appropriate instants, and control the interlinking and combination of the various operations, which will now be explained in the following example of measurement:

The operator introduces a specimen of 1.070 gm. of ethylene polyterephthalate into the dissolver 1 through the charging stopper 22 and inserts the appropriate punched card. Water used for the temperature regulation is maintained at 25±0.01° C. in the tank 4 and the pump 5 is stationary.

Orthochlorophenol employed as solvent is introduced into the dissolver 1 through the valve 9, the agitating device is started and the device for regulating the temperature of the dissolver maintains the temperature of the solution therein at 75±1° C. When the level of the solution reaches the electodes of the level detector 26, valve 9 is closed and the specimen is allowed to dissolve for 45 minutes.

At the end of this first phase, the punched card operates to stop the heating of the resistor 35, to circulate the water and to open the valve 10, which supplies orthochlorophenol to the dropping device 29, which permits accurate adjustment of the volume of the solution. The lowering of the temperature results in a reduction of the volume of this solution, which is adjusted by the combined action of the valve 10 and of the level detector 25. This adjustment phase lasts 25 minutes, the total quantity of solvent introduced into the dissolver then being 107 cc. so that the concentration of the solution obtained is 1% by weight per volume.

The punched card then neutralises the action of the level detector 25 and opens the electromagnetic valve 13, thus admitting a vacuum to the top of the viscometric device and thereby causing the solution to rise in the latter to the level of the detector 47, operation of which closes the valve 13 and connects the viscometric device with the atmosphere. At the same time, the punched card temporarily ceases to effect any programming, this henceforth being continued operation after operation, each completed operation initiating the succeeding operation by means of the step-by-step relay 67.

The solution then falls again by gravity into the dissolver, thereby producing a first flushing of the viscometric device. As soon as the second level detector 43 is uncovered, the step-by-step relay brings about the reopening of the valve 13 and initiates a second filling, followed by a second flushing as before.

The step-by-step relay then initiates a third filling and places in circuit counters 63 and 64, the counting of which is started when the level of the solution reaches the corresponding detector 42. Counting continues until the level of the solution reaches the corresponding detector 43, operation of which stops the counter. As before, the second uncovered detector 43 opens the valve 13, and a second measuring cycle commences, the results of which are then recorded by two other counters 65 and 66 identical to the preceding ones.

In the described example, in which capillaries having a diameter of 0.9 mm. and a length of 85 mm. are employed, the times of flow detected are indicated in Table 1, in which the third column indicates the times obtained with the pure solvent, i.e., without the dissolution phase:

TABLE 1

|  | 1st measurement, s. | 2nd measurement, s. | Pure orthochlorophenol, s. |
|---|---|---|---|
| Capillary I | 183.9 | 184.1 | 104.15 |
| Capillary II | 158.2 | 158.4 | 89.35 |

By suitable calculation the relative viscosities obtained are found to be 1.77 and 1.75 respectively.

At the end of this second cycle, the step-by-step relay causes programming to be continued by the punched card, which opens the valve 14, thus placing the discharge tank 15 under a vacuum, and stops the agitating device. The solution meanwhile collected by gravity in the dissolver is discharged therefrom.

Thereafter punched card closes valve 14, opens valve 9 and sets the agitating device in action again in order to flush the dissolver with orthochlorophenol, and finally causes the discharge of the flushing orthochlorophenol at 15 as before.

The total duration of the foregoing operations is 1 hour 30 minutes, the apparatus then being ready for a further series of measurements.

One embodiment of the present invention has been described with reference to the measurement of the viscosity of a polyester, but it is obvious that the temperature adjustments, the durations of the card-programmed phases and the number and combination of the phases may be modified in accordance with the necessities arising in the viscosity measurement in question. The card-operated programme control unit combined with a step-by-step relay affords the greatest flexibility in this respect and constitutes an interesting advantage of the invention.

In the testing of specimens of polyamides and polyurethanes which may be dissolved in formic acid and in dimethylformamide respectively, the dissolving may be carried out at the same temperature as the measurement of the times of flow, i.e., 25° C. Dimethylformamide will also be employed for the dissolving of acrylonitrile-based polymer at temperatures 25–70° C. and at concentrations of 2‰ by weight/volume, the measurement of times of flow preferably always taking place at 25° C.

The described apparatus also lends itself to the measurement of viscosity at higher temperature, for example with polyolefin specimens, for which the dissolving of the specimen is effected in a mixture of tetralin and decalin at 150° C., and the measurement at 130° C. In this case, the thermostatic liquid will obviously not be water, but a liquid which is stable at the measuring temperature, the thermostatic device being adapted accordingly.

In the case of more volatile solvents, the transfers of solution will advantageously be effected by superatmospheric pressure instead of by negative pressure, by modifications to the apparatus which can readily be effected by a person skilled in the art. The described apparatus is thus adapted to the measurement of the viscosity of products such as cellulose esters as indicated in Table 2 below:

TABLE 2

| Polymer | Solvent | Dissolution Temp., °C. | Concentration by weight/volume, ‰ | Measurement at— |
|---|---|---|---|---|
| Acetate | $CH_3-CO-CH_3$ | 25 | 2 | 25° C. |
| Triacetate | $CH_2Cl_2/CH_3OH$ [1] | 25 | 2 | 25° C. |

[1] Mixture of equal weights.

In some cases, the dissolving operation may be more complex, for example when it is desired to determine the relative viscosity, in solution in water, of a washed specimen of polyvinyl alcohol, the concentration of which is first to be determined and which is then to be adjusted to a known value, for example 2‰ before the viscosity is measured.

We claim:

1. Apparatus for automatically measuring the viscosity of a solution of polymer, said apparatus comprising, in combination:
   (a) a storage reservoir for a solvent of the polymer;
   (b) a dissolving chamber;
   (c) a charging stopper to said dissolving chamber for introducing polymer into said dissolving chamber;
   (d) a duct connected between said storage reservoir and dissolving chamber to feed solvent to the latter;
   (e) a valve controlling the flow of solvent through said duct;
   (f) a level detector in said dissolving chamber, effective to control the operation of said valve;
   (g) a discharge duct to said dissolving chamber;
   (h) a viscometric device comprising at least one capillary viscometer;
   (i) a vacuum source;
   (j) a conduit connecting said dissolving chamber to said viscometric device;
   (k) means connecting said viscometric device to said vacuum source;
   (l) a first jacket surrounding said dissolving chamber;
   (m) a second jacket surrounding said viscometric device and connected to said first jacket for the flow of a common temperature regulating fluid; and
   (n) control means for controlling the operation of said apparatus in accordance with a predetermined program.

2. Apparatus as claimed in claim 1, wherein said level detector comprises two electrodes disposed opposite to one another at a short distance apart.

3. Apparatus as claimed in claim 1, and further comprising an external thermostatic device connected to feed fluid through said jacket to maintain the dissolving chamber and viscometric device at a constant temperature.

4. Apparatus as claimed in claim 1, wherein the control device includes a punched-card programme control unit.

5. Apparatus as claimed in claim 4, wherein the control device also includes a step-by-step programme relay, which effects the programming during the measurement of the time of flow of the polymers through the viscometer.

References Cited

UNITED STATES PATENTS

| | | | |
|---|---|---|---|
| 2,048,305 | 7/1936 | Ubbelohde | 73—55 |
| 2,095,282 | 10/1937 | Payne | 73—55 |
| 2,095,324 | 10/1937 | FitzSimons | 73—55 |
| 2,208,444 | 7/1940 | Bailey | 73—55 X |
| 3,071,961 | 1/1963 | Heigl et al. | 73—55 |
| 3,074,266 | 1/1963 | Sadler et al. | 73—55 |

OTHER REFERENCES

G. D. Patterson et al.: Capillary Viscometer for High-temperature Measurements of Polymer Solutions, in Review of Scientific Instruments, 29 (12), pp. 1086–1088, December 1958.

LOUIS R. PRINCE, Primary Examiner

J. W. ROSKOS, Assistant Examiner